United States Patent [19]
Barrera

[11] Patent Number: 5,921,288
[45] Date of Patent: Jul. 13, 1999

[54] APPARATUS FOR FORMING AND INSERTING COILS CONSTITUTING THE WINDING OF A STATOR OF A DYNAMO-ELECTRIC MACHINE

[75] Inventor: Giorgio Barrera, Turin, Italy

[73] Assignee: Polytool SRL., Turin, Italy

[21] Appl. No.: 08/878,465

[22] Filed: Jun. 18, 1997

[30] Foreign Application Priority Data

Jun. 28, 1996 [IT] Italy ................................ TO96A0555

[51] Int. Cl.[6] ................................................. H02K 15/04
[52] U.S. Cl. ........................................... 140/92.1; 29/732
[58] Field of Search ..................... 29/732, 734; 140/92.1

[56] References Cited

U.S. PATENT DOCUMENTS

| | | |
|---|---|---|
| 3,324,536 | 6/1967 | Hill . |
| 3,579,818 | 5/1971 | Arnold et al. . |
| 4,151,636 | 5/1979 | Lauer et al. ............................... 29/734 |
| 4,186,478 | 2/1980 | Hamane et al. ........................... 29/734 |
| 4,512,376 | 4/1985 | Barrera . |
| 4,658,492 | 4/1987 | Kieffer et al. . |

*Primary Examiner*—Lowell A. Larson
*Attorney, Agent, or Firm*—Fish & Neave; Robert R. Jackson; Garry J. Tuma

[57] ABSTRACT

Apparatus and methods are presented for forming coils that are used for the winding of a stator of a dynamo-electric machine and for inserting those coils into slots of the stator. The apparatus includes a plurality of coiling stations that operate in a synchronously staggered manner and an inserting station. The coiling and inserting stations are equiangularly spaced apart from each other around a transfer station. Interposed between each coiling and inserting station and the transfer station is an exchange device that exchanges a coil-inserting tool at the coiling or inserting station with a coil-inserting tool at the transfer station.

10 Claims, 4 Drawing Sheets

APPARATUS FOR FORMING AND INSERTING COILS CONSTITUTING THE WINDING OF A STATOR OF A DYNAMO-ELECTRIC MACHINE

BACKGROUND OF THE INVENTION

The present invention relates to apparatus and methods for forming coils that are used for the winding of a stator of a dynamo-electric machine and for inserting those coils into slots of a stator.

A typical known stator of an electric motor is shown in FIG. 1. The stator includes an annular body 1 having a laminated structure with an inner cylindrical surface 2 and a plurality of longitudinal slots 3. Longitudinal slots 3 receive portions of copper wire coils 4, which constitute the winding W of the stator. Coils 4 are formed in a coiling machine that delivers the formed coils to a coil-inserting tool, such as, for example, the type disclosed in U.S. Pat. No. 3,324,536. Such a coil-inserting tool inserts the coils positioned thereon into slots of a stator, which are aligned over the coil-inserting tool.

Apparatus of the above type is also known that includes first and second coiling stations, an inserting station, and means (typically a platform rotatable around a vertical axis) to bring a coil-inserting tool sequentially to the first coiling station, then to the second coiling station, and lastly to the inserting station. This apparatus is used, for example, to provide stators of the type shown in FIG. 1. Such stators include a primary winding of two coils 4 arranged as shown in FIG. 1, and a secondary winding of two additional coils arranged at 90 degrees with respect to the primary winding coils. The coil-inserting tool receives the first pair of coils for the primary winding at the first coiling station, and the second pair of coils for the secondary winding at the second coiling station. From the second coiling station, the coil-inserting tool is brought to the inserting station where the primary and secondary windings are simultaneously inserted into the stator slots.

For conventional stators of the type shown in FIG. 1, the advantage of two coiling stations is limited, because a single coiling station can form coils for both the primary and secondary stator windings. Moreover, even if the two coiling stations operated in parallel, production capacity is limited because the cycle time of forming coils at a coiling station is often longer than the cycle time of inserting the coils at an inserting station. For example, insertion may be approximately 15 seconds, while forming coils may be approximately 30 seconds. Thus, production capacity is limited by the coiling time.

In view of the foregoing, it would be desirable to provide apparatus and methods with improved production capacity for forming and inserting coils that constitute the winding of a stator of a dynamo-electric machine.

SUMMARY OF THE INVENTION

It is an object of this invention to provide apparatus and methods with improved production capacity for forming and inserting coils that constitute the winding of a stator of a dynamo-electric machine.

In accordance with this invention, there is provided apparatus and methods for forming coils that are used for the winding of a stator of a dynamo-electric machine and for inserting those coils into slots of the stator. The apparatus includes first and second coiling stations, an inserting station, a transfer station that assists each of the coiling and inserting stations, and means for synchronously exchanging coil-inserting tools at each of the assisted stations with a coil-inserting tool at the transfer station.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention produces finished stators with a production capacity substantially equivalent to the production capacity of an inserting station. In a preferred embodiment in accordance with the principles of the present invention, two coiling stations operate on two different coil-inserting tools. Each coiling station forms and loads coils (for use as the primary and secondary windings of a stator) onto a coil-inserting tool. The coil-inserting tool inserts the coils into a respective stator at an inserting station.

The two coiling stations operate synchronously with respect to each other. That is, when the first coiling station completes its cycle, the coil-inserting tool, which has been loaded with coils formed at the first coiling station, is transferred to the transfer station and then to the inserting station, where the coils are inserted into a respective stator. Meanwhile, the second coiling station forms and loads another set of coils onto another coil-inserting tool, which is then transferred to the transfer station and to the inserting station as soon as the previous coil-inserting tool at the inserting station has inserted its coils into the respective stator. The inserting station is therefore continuously fed with loaded coil-inserting tools by the synchronous operation of the two coiling stations, thus significantly improving production capacity.

Preferably, the coiling and inserting stations are equiangularly spaced apart from each other around the transfer station. Transfer means for exchanging a coil-inserting tool at each of the coiling and inserting stations with a coil-inserting tool at the transfer station includes a plurality of exchange devices. One exchange device is interposed between each of the coiling and inserting stations and the transfer station. Thus, in the preferred embodiment shown in FIGS. 2–6, three exchange devices are provided. Each exchange device exchanges a coil-inserting tool at one station (i.e., a coiling or inserting station) with a coil-inserting tool at the transfer station.

In particular, the exchange devices operate as follows: a first exchange device between a first coiling station and a transfer station exchanges a coil-inserting tool loaded with coils at the first coiling station with an empty coil-inserting tool at the transfer station. A second exchange device between the transfer station and an inserting station then exchanges the loaded first coil-inserting tool with an empty coil-inserting tool at the inserting station. Similarly, a third exchange device between a second coiling station and the transfer station exchanges a coil-inserting tool loaded with coils at the second coiling station with the empty coil-inserting tool at the transfer station. As described below, the transfer of coil-inserting tools between the various stations is advantageously provided with relatively simple and inexpensive means.

Figure 1:
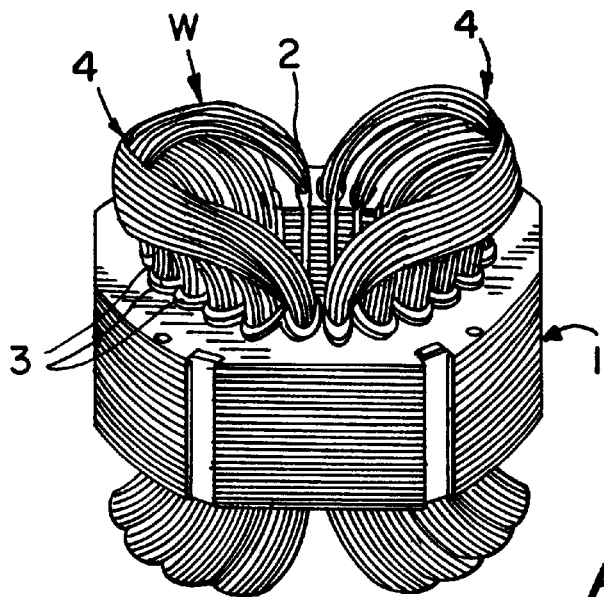
FIG. 1 is a perspective view of a known stator.
Figure 4:
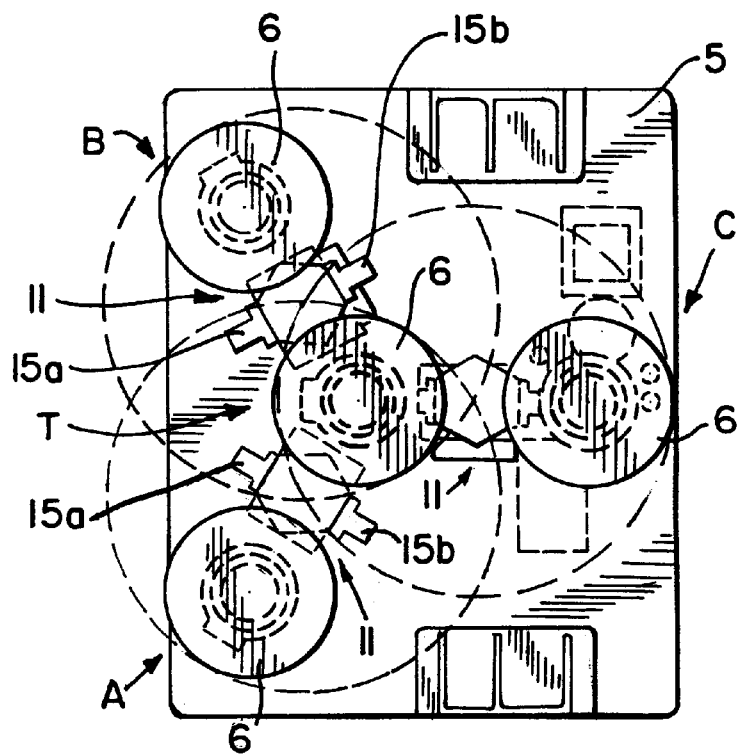
FIG. 4 is a cross-sectional view taken along line IV—IV of FIG. 3.
Figure 2:
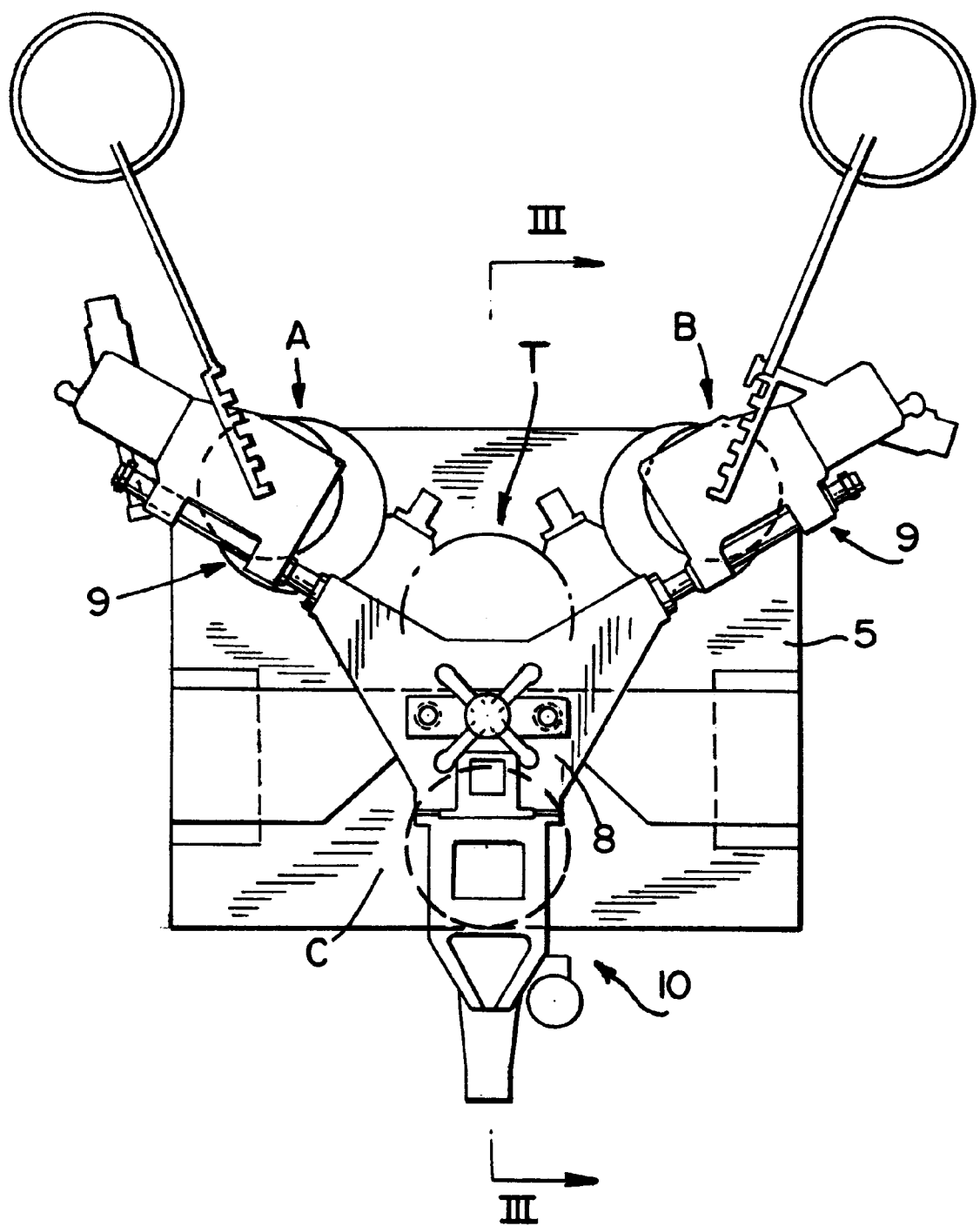
FIG. 2 is a plan view of a preferred embodiment of the apparatus according to the invention.
Figure 3:
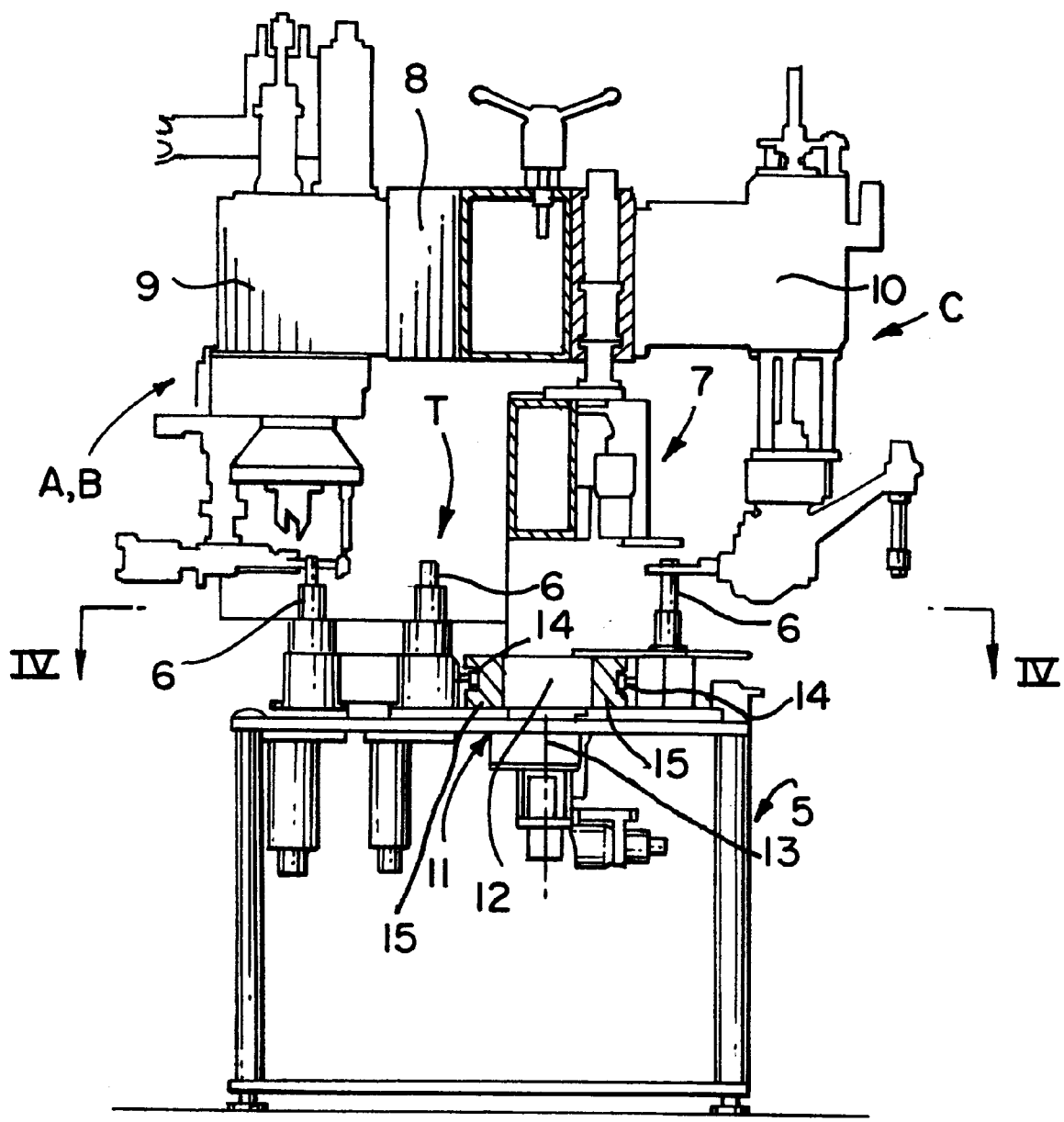
FIG. 3 is a cross-sectional view taken along line III—III of FIG. 2.

Referring to FIGS. 2–4, the apparatus according to the principles of the invention includes a base structure 5 that supports a first coiling station A, a second coiling station B, and an inserting station C, which are preferably equiangularly spaced apart from each other around a transfer station T. At each of stations A, B, C, and T, a coil-inserting tool 6 of any known type (such as, for example, the type disclosed in the U.S. patent above) is provided to either receive thereon coils formed at either station A or station B, or to insert the coils into slots 3 of a stator positioned at inserting station C. Above base structure 5, a column 7 extends upwardly as shown in FIG. 3, supporting at the top a support frame 8, which has two coil-forming heads 9 secured to it in a cantilever fashion at coiling stations A and B, respectively. Inserting equipment 10 is further secured to support frame 8 at inserting station C. The two coil-forming heads 9, which are preferably identical, and inserting equipment 10 are not disclosed in detail, because, as in the case of coil-inserting tool 6, these devices can be made in any known way and do not fall, taken alone, within the scope of the present invention. The elimination of these details from the drawings further renders them simpler and easier to understand.

Figure 5:
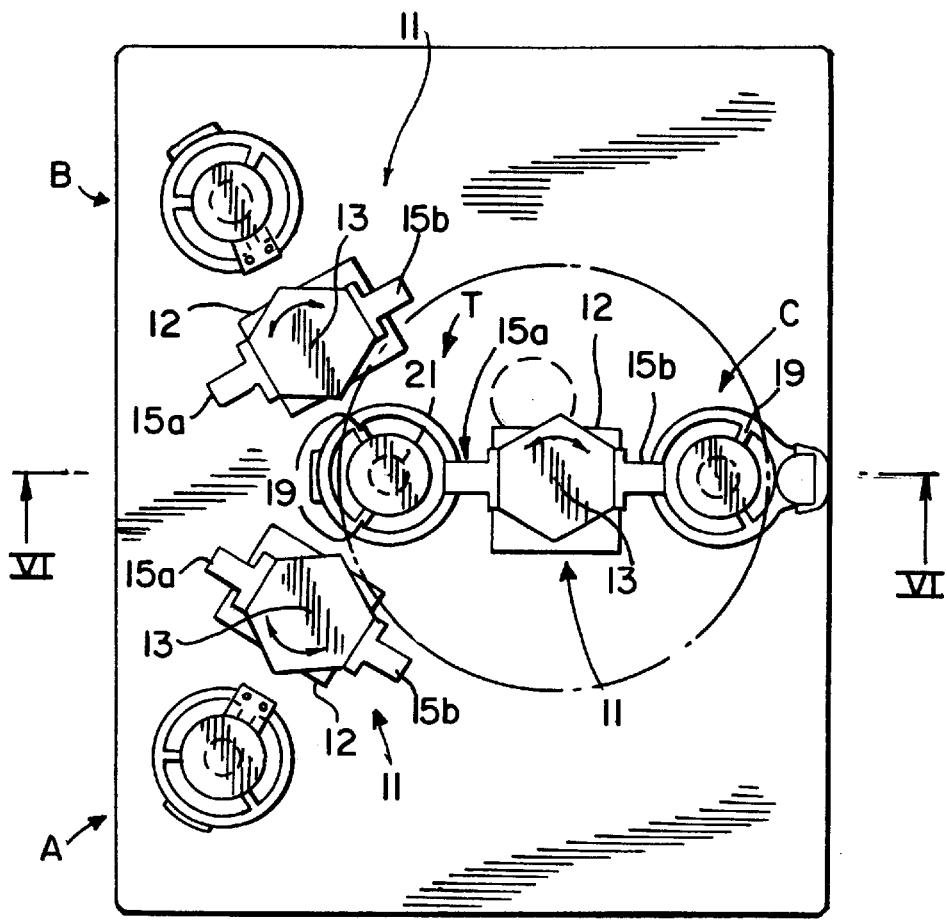
FIG. 5 is an enlarged portion of FIG. 4.
Figure 6:
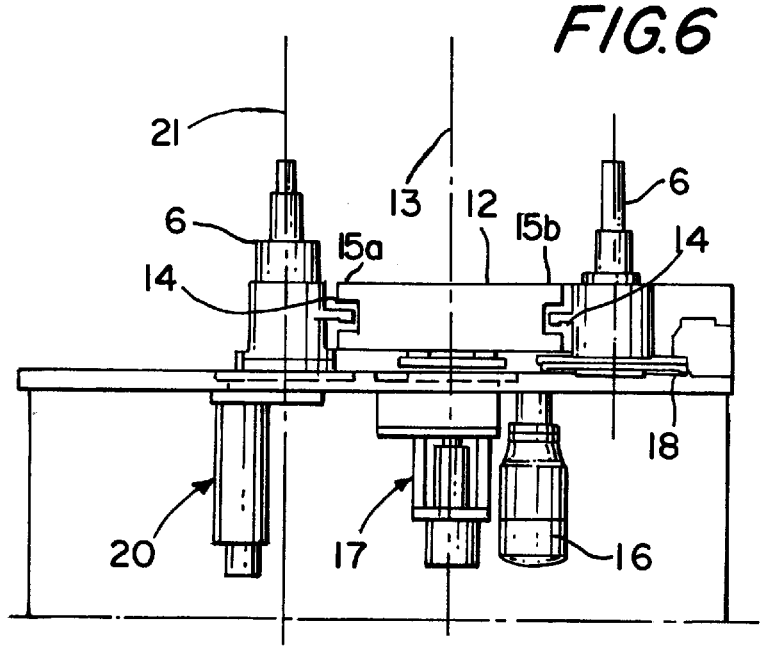
FIG. 6 is an enlarged portion of FIG. 3.

Referring now to FIGS. 5 and 6, above base structure 5, an exchange device 11 is interposed between each of the three operative stations A, B, and C, and transfer station T. Each exchange device 11 includes a central support 12 rotatably mounted around a central vertical axis 13. Central support 12 rotates around axis 13 by a motor 16 to exchange the coil-inserting tools that are respectively located at transfer station T and the operative station (A, B, or C) that is being assisted by central support 12.

Central support 12 further includes clamps 15a and 15b at opposite ends thereof for grasping horizontal projections 14, which form part of the base of coil-inserting tool 6. Clamps 15a and 15b preferably have teeth to engage reference holes in horizontal projections 14 for maintaining the proper position of coil-inserting tool 6 during its transfer by central support 12.

A raising unit 17 raises central support 12 after clamps 15a and 15b have grasped the respective horizontal projections 14, causing the bases of coil-inserting tools 6 to come out of centering circles 18 provided at the areas where coil-inserting tools 6 are positioned. Once the bases have come out of centering circles 18, central support 12 can be rotated around axis 13. Slots 19 are provided on the bases of coil-inserting tools 6 for receiving reference pins provided at the areas where coil-inserting tools 6 are positioned. These pins engage the sides of slots 19 to ensure proper alignment of coil-inserting tool 6 at each station.

A brushless motor 20 is provided at transfer station T to rotate a supporting structure where a coil-inserting tool 6 is located. Motor 20 rotates the structure and hence coil-inserting tool 6 around an axis 21 by a predetermined angle to provide coil-inserting tool 6 with the proper angular position for receiving the coils from coil-forming head 9 in accordance with the electric specifications for the stator. A further rotation of coil-inserting tool 6 by motor 20 brings horizontal projections 14 in alignment with clamps 15a and 15b of central support 12 such that coil-inserting tool 6 can be grasped for the next exchange.

The apparatus preferably operates as follows: the two coil-forming heads 9 form and load coils 4 onto coil-inserting tools 6 at respective coiling stations A and B. The forming and loading cycles of coiling stations A and B are synchronously staggered by approximately one half cycle. That is, at the start of coiling station B's cycle, coiling station A has completed half its cycle. When, for example, coiling station A completes its coil forming and loading cycle, the respective exchange device 11 exchanges the loaded coil-inserting tool 6 with an empty coil-inserting tool 6 located at transfer station T. The loaded coil-inserting tool 6, now located at transfer station T, is then exchanged with an empty coil-inserting tool 6 located at inserting station C. The exchange is made by the exchange device 11 between transfer station T and inserting station C. Inserting station C then inserts the loaded coils into a stator positioned at inserting station C. Meanwhile, coiling station B has completed its cycle, and its loaded coil-inserting tool 6 is then exchanged with the empty coil-inserting tool 6 that has been brought from inserting station C to transfer station T. From transfer station T, the loaded coil-inserting tool is then brought to inserting station C for insertion of the loaded coils into another stator.

This synchronously staggered operational cycle continues with coiling stations A and B time-sharing inserting station C to continuously supply inserting station C with loaded coil-inserting tools 6. Accordingly, because the cycle time of coil insertion at inserting station C is approximately one half the cycle time of coil forming and loading at each of the coiling stations A and B, production capacity is advantageously approximately doubled.

Other embodiments (not shown) may include additional coiling stations. For example, if the cycle time of coil insertion is approximately one third the cycle time of coil forming and loading, three coiling stations operating in a similar synchronously staggered manner with a single inserting station may advantageously be provided.

Thus it is seen that apparatus and methods with improved production capacity are presented for forming and inserting coils that constitute the winding of a stator of a dynamo-electric machine. Persons skilled in the art will appreciate that the present invention can be practiced by other than the described embodiments, which are presented for purposes of illustration and not of limitation, and the present invention is limited only by the claims which follow.

What is claimed is:

1. An apparatus for forming and inserting coils into slots of a stator of a dynamo-electric machine, said coils constituting the winding of said stator, said apparatus comprising:

a plurality of coiling stations, each of said coiling stations forming and loading coils onto one of a plurality of coil-inserting tools which is then present at said coiling station;

an inserting station for inserting said coils from said one of said plurality of coil-inserting tools, which is then present at said inserting station, into slots of a stator;

a transfer station for temporarily holding one of said plurality of coil-inserting tools; and separate exchange means interposed between said transfer station and each of said coiling and inserting stations, each of said exchange means exchanging coil-inserting tools between said transfer station and a respective one of said coiling and inserting stations.

2. The apparatus of claim 1 wherein said plurality of coiling stations have synchronously staggered forming and loading cycles.

3. The apparatus of claim 1 wherein said coiling and inserting stations are equiangularly spaced apart from each other around said transfer station.

4. The apparatus of claim 1 wherein at least one of said exchange means comprises an arm which is rotatably mounted around a central vertical axis, said arm having opposite ends provided with clamping members that cooperate with coupling elements on said coil-inserting tools.

5. The apparatus of claim 4 wherein said clamping members have teeth for engaging said coupling elements on said coil-inserting tools.

6. The apparatus of claim 1 wherein at least one of said coiling, inserting, and transfer stations comprises centering circles for properly positioning said coil-inserting tools.

7. The apparatus of claim 1 wherein at least one of said coiling, inserting, and transfer stations comprises reference pins for properly aligning said coil-inserting tools.

8. The apparatus of claim 1 further comprising a motor for properly aligning said coil-inserting tools for engagement with said exchange means.

9. A method of forming and inserting coils into slots of a stator of a dynamo-electric machine, said coils constituting the winding of said stator, said method comprising the steps of:

forming first coils at a first coiling station;

loading said first coils onto a first coil-inserting tool at said first coiling station;

exchanging said first coil-inserting tool with another coil-inserting tool between said first coiling station and a transfer station;

exchanging said first coil-inserting tool with another coil-inserting tool between said transfer station and an inserting station;

inserting said first coil into slots of a stator;

forming second coils at a second coiling station;

loading said second coils onto a second coil-inserting tool at said second coiling station;

exchanging said second coil-inserting tool with another coil-inserting tool between said second coiling station and said transfer station;

exchanging said second coil-inserting tool with another coil-inserting tool between said transfer station and said inserting station; and inserting said second coil into slots of a stator.

10. The method of claim 9 wherein said steps of exchanging comprise the steps of:

engaging said coil-inserting tool with clamping members;

raising said coil-inserting tool;

rotating said coil-inserting tool around a central axis;

lowering said coil-inserting tool; and positioning said coil-inserting tool by aligning reference pins with corresponding structures on said coil-inserting tool.

* * * * *